UNITED STATES PATENT OFFICE.

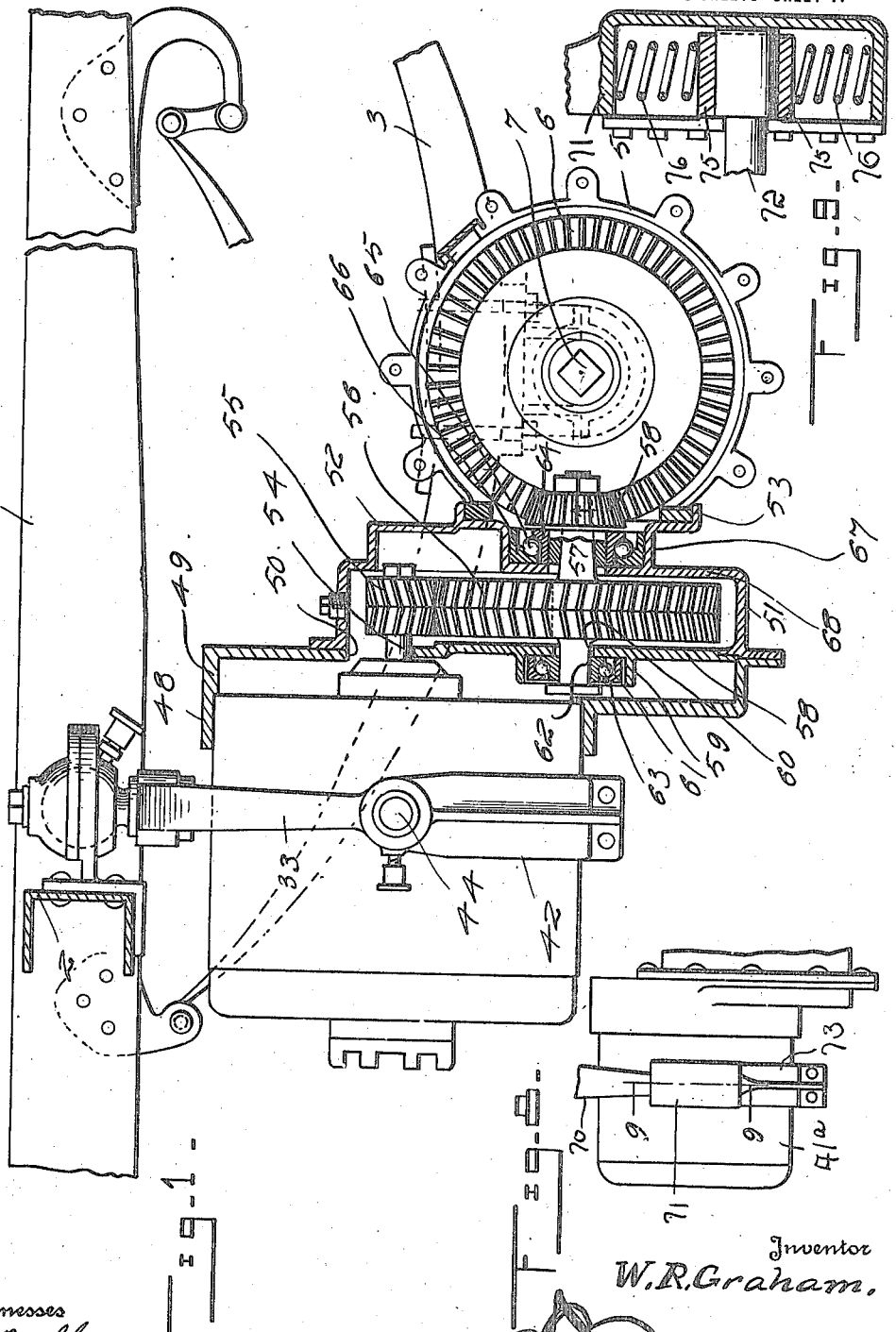

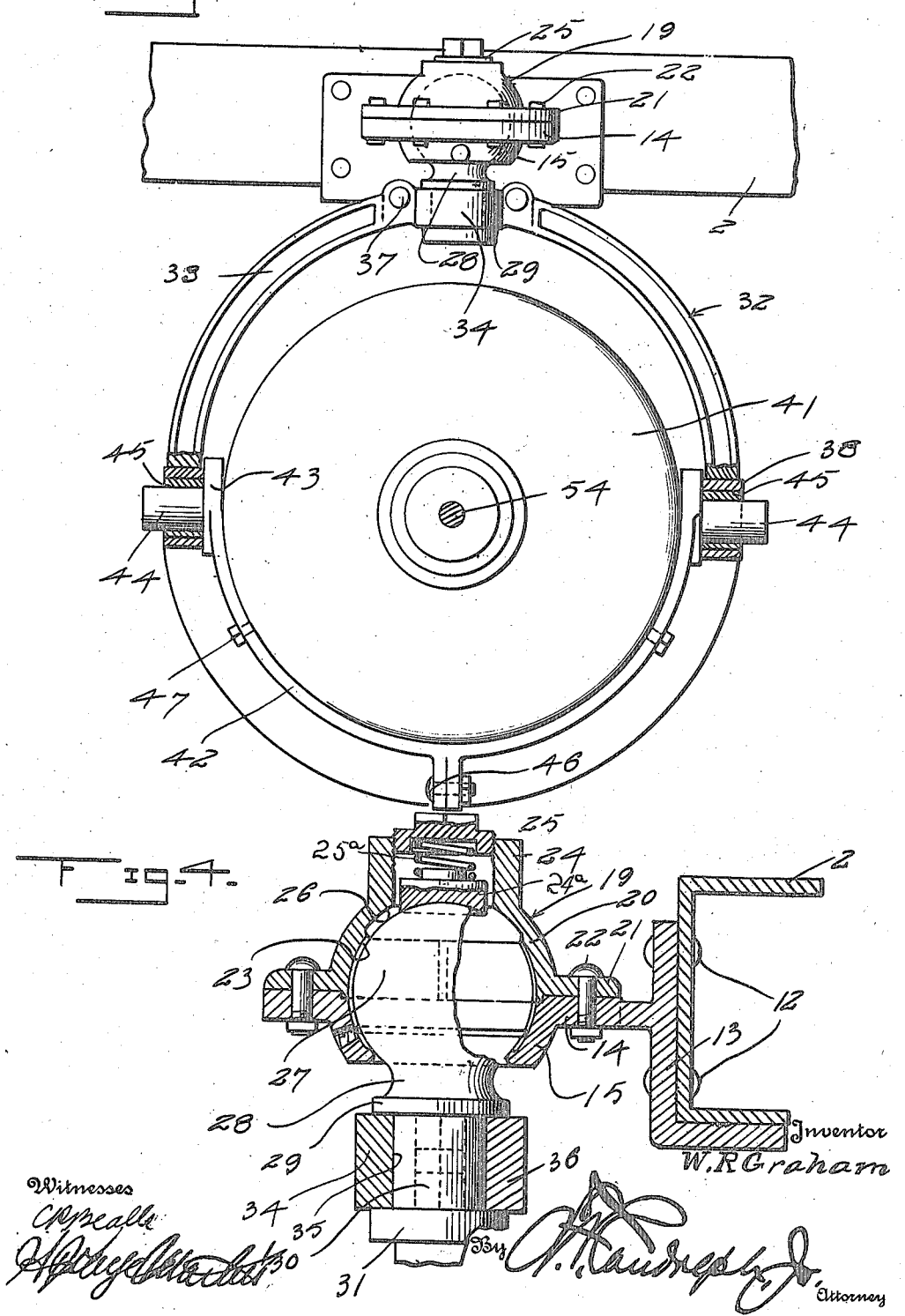

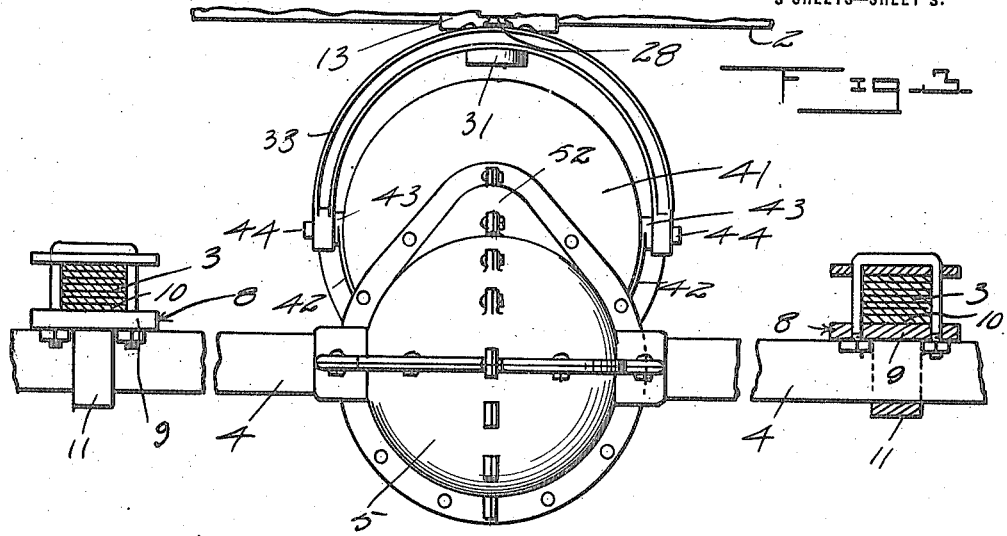
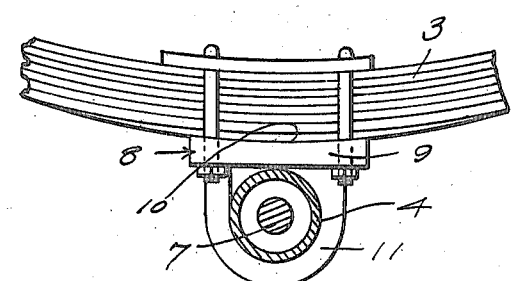
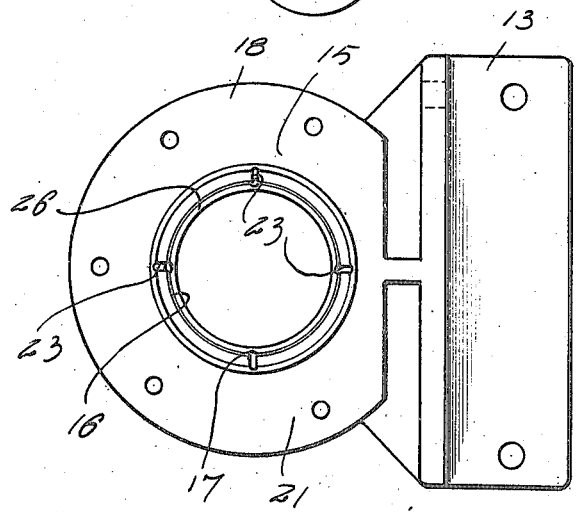
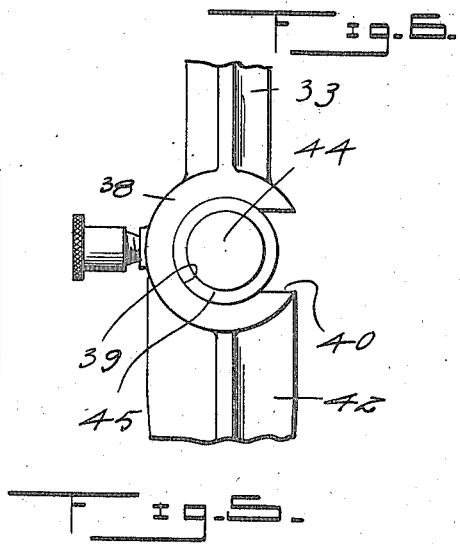

WELLINGTON R. GRAHAM, OF BROOKLYN, NEW YORK.

MOTOR-HANGER.

1,264,059.

Specification of Letters Patent.　Patented Apr. 23, 1918.

Application filed June 16, 1917.　Serial No. 175,226.

*To all whom it may concern:*

Be it known that I, WELLINGTON R. GRAHAM, a citizen of the United States, residing at Brooklyn, in the county of Kings and State of New York, have invented certain new and useful Improvements in Motor-Hangers; and I do hereby declare the following to be a full, clear, and exact description of the invention, such as will enable others skilled in the art to which it appertains to make and use the same.

This invention relates to new and useful improvements in motor hangers and the principal object of the invention is to provide a device for use in supporting the driving motors of a motor vehicle so as to eliminate the necessity of using the ordinary universal joint and propeller shaft between the motor and the drive axle.

Another object of the invention is to provide a device which will flexibly support the motor in place so as to allow for free movement of the axle and yet enable the device to be directly connected to the differential gearing.

A further object of the invention is to provide a device which is supported in such position as to be readily removed for making repairs and the like.

With these and other objects in view, the invention consists in the novel combination and arrangement of parts which will be fully set forth in the following specification and accompanying drawings, in which:—

Figure 1 is a longitudinal sectional view through a motor vehicle, showing this device as it would appear when applied thereto;

Fig. 2 is an end view of Fig. 1 illustrating in detail, the hanger;

Fig. 3 is a fragmentary transverse sectional view through a vehicle showing the device from the rear;

Fig. 4 is an enlarged detail sectional view through the hanger ball and the socket therefor;

Fig. 5 is a plan view of the socket;

Fig. 6 is an enlarged detail view of the joint between the yoke and saddle;

Fig. 7 is an enlarged detail view of the spring seat and axle showing the latter in section;

Fig. 8 is a fragmentary side elevation of a modified form of my invention, and

Fig. 9 is a sectional view taken on the line 9—9 of Fig. 8.

Referring to the drawings by characters of reference, the numeral 1 designates one of the side bars of a chassis having connected thereto an intermediate bar 2. This bar extends to the opposite side bar of the chassis not shown and forms the support for the hanger which will be more fully hereinafter described. The spring of the chassis is designated by the numeral 3 and is composed of laminations of the usual construction. The drive axle is designated by the numeral 4 and is provided centrally with the differential housing 5 in which the differential driving gears which will be more fully hereinafter described, are mounted. The differential gearing is provided with the usual main drive gear 6 and is connected to the usual drive shafts 7. The springs rest on the spring seat designated generically by the numeral 8 each of which comprises a plate 9 having its upper surface depressed as at 10 to form a rest against which the under side of the spring engages. The under face of the plate 9 is formed with a yoke 11 which surrounds the axle housing 4 in order to form a connection between the spring and axle. It will be understood that the seat is rockably mounted on the axle housing so as to allow the free movement of the spring.

Riveted or otherwise secured as at 12 to the bar 2 is an angle plate 13 having extending outwardly therefrom an arm 14 supporting the socket 15 in which the ball is operable. This socket 15 is shown in detail in Fig. 5, and is formed with the depression 16 which is provided in its bottom wall with a plurality of spaced grooves 17 to provide a means for retaining lubricating oil in place around the ball. The socket 15 is surrounded by a flange 18 which forms a rest for the socket cap designated generically by the numeral 19 which comprises a dome-shaped body 20 having a flange 21 formed at its periphery, which flange together with the flange 18 is apertured to receive attaching bolts 22 by which the cap is held in place. The inner side of the cap is formed with grooves 23 like the grooves 17 and the central portion of said cap is provided with an internally screw threaded and flanged aperture 24 into which a plug 25 is threaded. A presser block 24ª is arranged in the aperture 24 and is retained in inwardly extended position by a spring 25ª. The inner side of the wall of the cap immediately adjacent the threaded opening 24 is recessed, as at 26, to form a pocket in which the lubricant is retained.

Fitted into the cap previously described and resting on the inner face of the socket 15 is the hanger ball, designated by the numeral 27, which is provided with a reduced neck 28 and provided at its lower end with a flange 29 having projecting downwardly therefrom a stud 30, the lower end of which is formed with a flange 31 for retaining the saddle in place.

The saddle above referred to comprises an arcuate body designated generically by the numeral 32, which body comprises a pair of arms 33 joined centrally by a plate 34, which in turn is formed centrally with a cylindrical depression 35 into which the stud 30 of the ball 27 extends. A suitable cover plate 36, which is constructed in a manner similar to the plate 34, is adapted to fit over the opposite side of the stud 30 and be secured by suitable bolts, or other fastening means 37, to the plate 34 hereinbefore described, thus forming an encircling member around the stud 30, which swively supports a yoke 32 in place. The ends of the arms 33 of the yoke 32 are formed with hub portions 38, which are formed with enlarged bores 39 extending transversely therethrough and slots 40 which lead from the bore to the outer side of the hub. The width of the slots 40 is less than the diameter of the bores 39 for a purpose which will be more fully hereinafter described.

Extending beneath the motor 41 is the supporting saddle 42 which consists of an arcuate body formed at the end of its arms with enlarged plates 43 having the studs 44 formed thereon. The studs 44 are of a diameter equal to the width of the slots 40 in the hubs 38 and the distance between the arms of the saddle 42 and the ends of the arms of the yoke 32 is such that the studs when the device is in assembled position will project through the openings 39 in the hubs 38. In order to hold the studs in place a suitable removable bushing 45 is provided the inner bore of which receives the studs 44 while the periphery fits the opening 39 of the hub 38 thereby preventing accidental displacement of the stud and yet allowing the saddle to be readily removed from the yoke. It will be understood that if so desired, the saddle 42 may be made in two separate pieces and bolted together centrally, as at 46, without departing from the spirit and scope of the invention. The arms of the saddle are preferably bolted, as at 47, to the motor 41 thus firmly supporting the motor in place.

Surrounding the rear end of the motor is a band 48 which is formed integrally with the housing 49 which is provided with an enlarged opening 50 in its rear wall. A housing 51 is secured to the rear face of the housing 49 and surrounds the opening 50 and the rear end of the housing 51 is provided with an off-set portion 52 having formed thereon a flange 53 which surrounds the forward end of the differential housing 5. The motor shaft 54 extends into the housing 51 and is provided with a herring-bone pinion 55 which meshes with a herring-bone gear 56 mounted on the drive shaft 57 the rear end of which carries a beveled pinion 58 for meshing engagement with the beveled gear 6 of the differential housing 5. The shaft 57 is journaled in suitable anti-friction bearings carried by the housing 51 which will be more fully hereinafter described. The housing 51 above referred to is provided with a front wall 58 provided with a hollow boss 59 arranged in axial alinement with relation to the shaft 57. An opening 60 is formed in the wall 58 in alinement with the shaft 57 and accommodates the forward end thereof. A suitable cup 61 is mounted in the boss 59 while a similar cup 62 is mounted on the forward end of the shaft 57 and bearing balls 63 run between the cups as will be clearly seen upon reference to Fig. 1. The opposite end of the shaft adjacent the beveled pinion 58 carries a cup 64 in which suitable bearing balls 65 run which in turn run in a cup 66 which is secured in the hub portions 67 of the rear wall 68 of the housing 51. In this way it will be seen that the friction of the shaft 57 is reduced to a minimum.

It will be apparent from the foregoing that the use of a device of this character will avoid the necessity of providing a universal joint between the propeller shaft and the motor and between the propeller shaft and differential gear. It will also avoid the necessity of using the usual radius rods and will mount the motor in such position as to be readily movable with the rear axle and yet allow for a direct drive of the axle from the motor. When the rear axle moves upwardly it will be seen that the motor will be rocked on the trunnions 44 and any forward, rearward or side movement of the rear axle will be permitted by the ball and socket joint.

In the modification of the invention illustrated in Figs. 8 and 9 there is shown a motor hanger for supporting a motor under the chassis of a motor vehicle in which the springs 3 are rigidly connected with the rear axle 4. Referring in detail to these figures, the numeral 41ª indicates the motor received between the arms of the yoke 70. The lower terminals of the yoke arms are enlarged and vertically recessed to provide housings 71 into which the laterally projecting studs 72 of the saddle 73 project. The inner walls of the housings are provided with vertically elongated slots 74, permitting vertical movement of the studs 72 and motor 41ª with relation to the yoke 70.

The outer terminals of the studs are headed and engaged with presser blocks 75 and expansion springs 76 are confined between the tops and bottoms of the housings and the presser blocks to resiliently retain the studs in a position intermediate the ends of the housing, and thus permit vertical movement of the axle and motor with relation to the yoke 70 and vehicle frame against the tension of the springs 76.

In both types of the invention, the pull exerted by the pinion 58 upon the differential gear 6, during the forward movement of the vehicle, effects an upward push on the motor, thereby relieving the cross bar 2 of considerable strain.

What is claimed is:—

1. The combination with a chassis, of a yoke, a universal connection between the yoke and the chassis, a motor, and a saddle secured to the motor and pivotally secured to the yoke.

2. The combination with a chassis, of a yoke, comprising an arcuate body, a universal connection between the center of the arcurate body and the chassis, an arcuate saddle, a motor adapted to fit in the saddle, studs on the ends of the arms of the arcuate saddle adapted to fit in apertures in the ends of the arms of the yoke to pivotally connect the saddle to the yoke.

3. A motor hanger comprising a yoke adapted to be universally connected to a chassis, the ends of the arms of the yoke being apertured and having slots extending radially thereinto, the slots being of less width than the diameter of the apertures, bushings adapted to be removably secured in the apertures, a saddle, studs carried by the ends of the arms of the saddle, said studs being adapted to slide through the slots in the yoke and to be received in the openings of the bushings.

4. In a motor hanger, the combination with a chassis, of an angle bracket secured to the chassis, a ball socket formed on the angle bracket, a ball seated in said bracket to provide a universal joint, an arcuate yoke swivelly connected to the ball, a saddle pivotally connected to the ends of the arms of the yoke, a motor supported in the saddle, a transmission on the chassis, and means connecting the motor with the transmission.

5. In a motor hanger, the combination with a chassis, of an angle bracket secured to the chassis, a ball socket formed on the angle bracket, a ball seated in said bracket to provide a universal joint, an arcuate yoke swivelly connected to the ball, a saddle pivotally connected to the ends of the arms of the yoke, a motor supported in the saddle, a transmission on the chassis, and gearing connecting the motor with the transmission.

6. In a motor hanger, the combination with a chassis, of an angle bracket secured to the chassis, a ball socket formed on the angle bracket, a ball seated in said bracket to provide a universal joint, an arcuate yoke swivelly connected to the ball, a saddle pivotally connected to the ends of the arms of the yoke, a motor supported in the saddle, a transmission on the chassis, a housing surrounding the transmission, means connecting the transmission with the motor, and a housing inclosing said means.

7. A motor hanger comprising a saddle, a motor secured in said saddle, a yoke pivoted to the ends of the saddle, and rotatable and universal connections between the yoke and the chassis of an automobile.

In testimony whereof I affix my signature in presence of two witnesses.

WELLINGTON R. GRAHAM.

Witnesses:
   HENRY TABLE PORTER,
   WILLIAM E. GERTLOFF.